May 10, 1955 M. JOYCE ET AL 2,708,221
AUTOMATIC TELEPHONE DIALLING INSTRUMENT
Filed Oct. 27, 1950
FIG. 1.
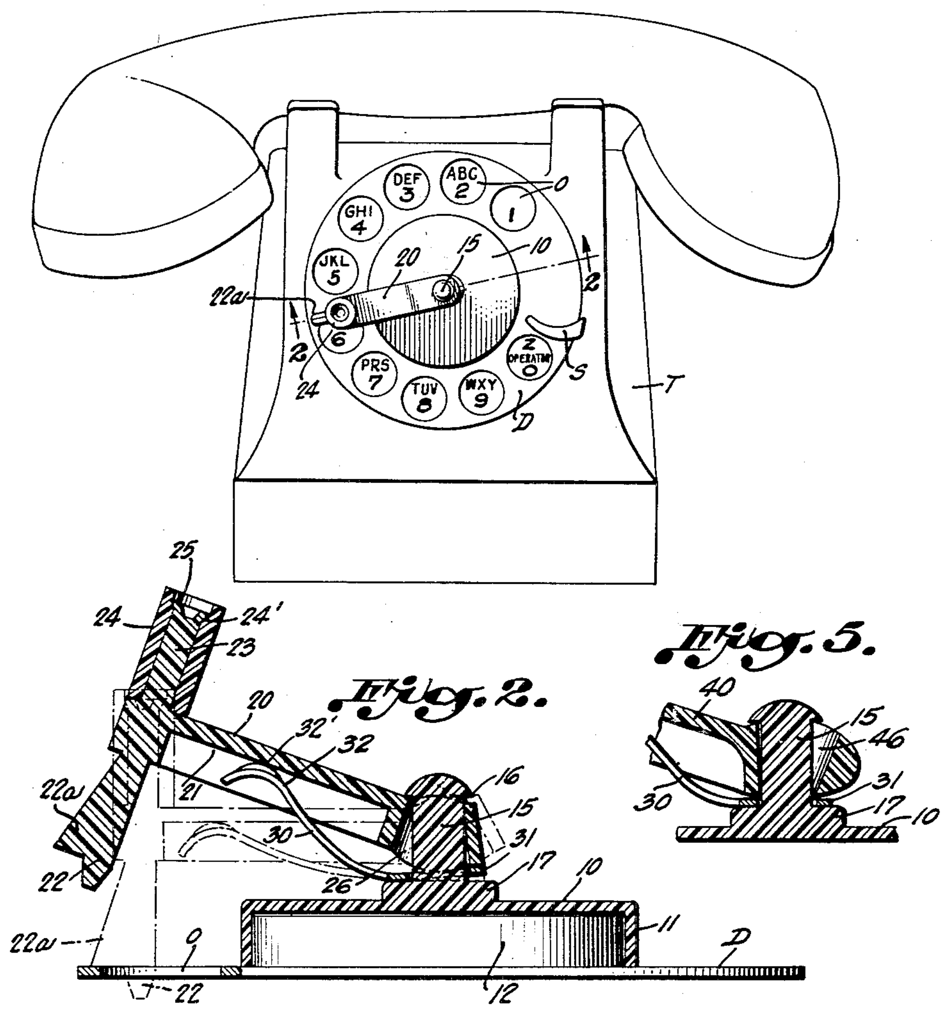
FIG. 1, FIG. 2, FIG. 5
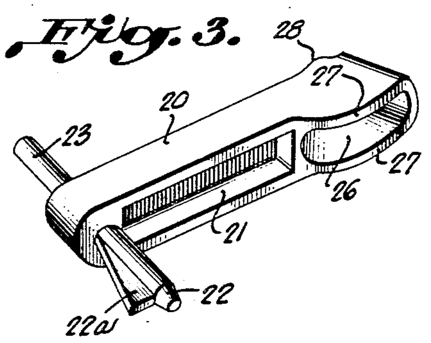
FIG. 3.
FIG. 4.
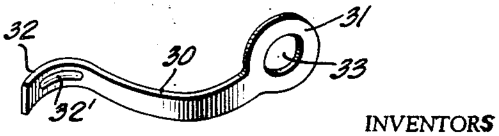
INVENTORS
MAURICE JOYCE
HARTWELL F. TUCKER
BY Samuel Klonitz
ATTORNEY

United States Patent Office 2,708,221

Patented May 10, 1955

2,708,221

AUTOMATIC TELEPHONE DIALING INSTRUMENT

Maurice Joyce, Washington, D. C., and Hartwell F. Tucker, Detroit, Mich.

Application October 27, 1950, Serial No. 192,544

5 Claims. (Cl. 179—90)

This invention relates to an attachment for an automatic telephone transmitter and more particularly to a manually operated dialing device therefor.

It is the object of the present invention to provide an improved attachment for an automatic telephone transmitter which may be molded from plastic materials and assembled in a manner to provide an economical and rugged attachment for such transmitters, so that the dialing may be performed therewith without need for use of the fingers engaging the openings in the rotatable dial forming part of said transmitters.

It is the object of the present invention to provide an attachment for an automatic telephone transmitter which may be mounted and dismounted very quickly and conveniently and one which requires no modification of the standard instruments to which the same are applied.

It is a further object of the invention to provide an attachment for dial-type telephone transmitters which is pleasing and ornamental in appearance and which does not impede the visibility of the indicia of numerals and letters on such transmitters which are necessary to see in the course of performing the dialing operations.

The invention lends itself to the combination of advertising material with the attachment which, in consequence of the attractive and pleasing form of the attachment, will direct the telephone user's attention to the advertising every time that the telephone is operated.

It is a further object of the invention to provide an attachment which is adapted to fabrication by plastic molding techniques in the most economical manner to produce an attractive and commercially appealing item. The assembly is made up of a minimum number of plastic parts and with only a single metallic part which functions as a spring, to produce a structure which is capable of giving a long useful life of service without deterioration or breakdown.

The invention proceeds upon the principle of mounting a molded plastic shell upon the central cap of a conventional rotatable dial of an automatic telephone transmitter, which shell is maintained in place on the centrally disposed portion or cap of the dial plate by means of a frictional fit. A boss extends upwardly from the plastic shell for the purpose of rockably and pivotally mounting a molded plastic arm thereon by means of a trapezoidally-shaped opening embracing the boss. The free end of the arm is provided with a projection which normally depends in a pendulous position and extends resiliently above the level of the rotatable dial plate, but which may be pressed into one of the openings therein upon the exertion of pressure on a handle at the free end of the arm so that the subsequent rotation of the arm causes a rotary movement of the dial to an extent corresponding to the location of the opening into which the projection was inserted relative to the fixed stop against which the arm strikes at the conclusion of the impelling operation. Thereafter, a release of the free end of the arm and a consequent rising thereof permits the dial to return to its original position during which period the desired electrical impulses are transmitted to the central telephone exchange. Also, a release of the dialing arm permits it to drop by gravity into a vertical position in readiness for selective engagement with any of the dial openings.

The molding of the assembly from plastic resins makes possible a wide range of ornamental effects. This is particularly true when styrene resins are used, in which case all colors ranging from crystal clear transparencies through the entire spectrum of jewel colors, as well as beautiful translucents and opaques may be obtained. By using transparent parts, an effective advertising medium can be combined with the attachment in order to place before the telephone user at all times desired information such as the name of a product or establishment, its telephone number, or any other desired indicia. If the advertising matter is placed above and upon the opposite sides of the dialing arm in its vertically disposed rest position, maximum visibility thereof is assured.

While mechanical dialing arrangements have been devised previously for attachment to automatic telephone transmitters for use in lieu of the fingers or other instrumentalities, such devices have not embodied the novel features of the instant invention.

Other objects and purposes will appear from the detailed description of the invention following hereinafter, taken in conjunction with the accompanying drawing, wherein Fig. 1 is a front view of an automatic telephone transmitter having the attachment in accordance with the present invention applied thereto in a plan view;

Fig. 2 is a vertical sectional view along line 2—2 of Fig. 1 with the dialing arm shown in dotted lines to illustrate its alternative position;

Fig. 3 is a perspective view of the integrally molded dialing arm in accordance with the invention;

Fig. 4 is a perspective view of the metallic leaf spring forming part of the assembly; and Fig. 5 is a partial vertical sectional view of another embodiment of the invention with a modified form of connection between the dialing arm and its support.

In Fig. 1 is shown an automatic telephone transmitter T of the conventional type having a saddle for receiving a combined transmitter and receiver and incorporating on the front face thereof an impulsing device for the purpose of dialing desired telephone exchanges and numbers. Such an impulsing device includes a rotatable dial plate D provided with circumferentially arranged openings O overlying a fixed dial plate bearing the desired indicia of letters and figures, which are necessary in the proper selection of the numbers of impulses required in the transmission of the proper signals to the central exchange stations. A finger stop S is shown mounted in fixed relation to the rotatable dial plate D in order to limit the clockwise motion of the rotatable dial plate in any of its selected movements so that the predetermined number of impulses may be transmitted in the course of its retrograde movement.

The invention is concerned with the provision of an attachment to such telephone transmitters in order to eliminate the need for the use of the finger or other instrument such as a pencil, which are usually inserted into the openings O to produce the rotary movement of the rotary dial plate to the limit controlled by the finger stop S. Such an attachment in accordance with the present invention is formed of a molded plastic shell 10 having the lateral wall 11 which is adapted to overlie the cap 12 generally provided at the center of the dial plate D and to engage therewith by a frictional fit, which in most cases requires a downwardly exerted pressure to effect the engagement, and a prying up to effect the disengagement of the shell 10 with respect to the central cap 12.

The molded plastic shell 10 is formed with a cylindrical post or boss 15 extending upwardly from the enlarged center 17 of the shell. This boss is adapted to receive the apertured end of the dialing arm 20 which is cast as a single piece in suitable dies. The opening 26 at one end of the arm is trapezoidally-shaped along the longitudinal axis of the arm, that is, the opening at the top of the arm (Fig. 2), is substantially circular in outline and is only slightly larger than the external dimension of the cylindrical boss 15 whereas the opening at the bottom of the arm is extended in length and is of a width corresponding substantially to the opening at the top, suitable clearance being provided for the movement of the arm about the post. The general outline of the opening may be readily seen in Figs. 2 and 3 wherein the base of the trapezoid is at the bottom of the arm and the top of the trapezoid is adjacent to the upper end of the post or boss 15. The opening permits both a rotary and rocking movement of the arm relative to the post.

The opposite end of the arm is provided with integrally molded pins or projections 22 and 23. The pin 22 extending from the bottom of the arm is adapted to engage the openings O in the dial plate, and a lateral protuberance **22*a* formed integrally with the pin serves as a stop against excessive rocking movement of the arm when it strikes the upper surface of the dial plate. Thus, the integrity of the pivotal mounting of the arm 20 on the post 15 is maintained for a long period of time without breakdown. The projection 23 extending from the upper surface of the arm forms part of the hand-hold for manipulating the dialing arm, and this hand-hold is completed by fitting a plastic sleeve element 24 having a countersunk top 24' over projection 23. Thereafter the end 25 of projection 23 is spun over the countersink 24' to maintain the sleeve 24** in permanent engagement with the attachment.

A metallic spring 30, which may be of spring steel, is provided with a circular end 31 and a curved end 32. The circular end 31 has an opening 33 which is slightly larger than the diameter of the boss 15 and the same is fitted thereover with the free end of the spring 32 having a protuberance 32' pressed thereinto, in engagement with the channeled aperture 21 on the underside of the dialing arm 20. With the dialing arm 20 in position, i. e., with opening 26 embracing the post 15 and the spring 30 therebelow, the upper end of the boss 15 is upset slightly to form a lateral offset 16 to maintain the spring 30 and the arm 20 permanently in place. The convex protuberance gives rise to free sliding movement of the spring relative to the arm with no cutting or abrading action therebetween which might be caused by burrs or rough edges on the sides of the spring.

The lateral edges 27 of the dialing arm on the opposite sides of the opening 26 are shaped convexly in order to facilitate the rocking movement of the dialing arm between its limiting positions as shown in solid and dotted lines in Fig. 2. Likewise the upper edges 28 of the opening 26 may be rounded off to effect a rocking of the arm along a fulcrum or point contact between the upper edges of the opening 26 and the offset 16 of the boss or post 15.

The assembled attachment as shown in Fig. 2 illustrates clearly the simplicity of the assembly which is made up of only four parts, namely, the plastic shell 10, the dialing arm 20, the sleeve 24 and the metal spring 30.

The spring 30 is normally biased to exert an upward pressure against the dialing arm 20 in order normally to maintain the pin 22 beyond the field of the openings O in the dial plate and beyond the top of the fixed stop S. This permits the arm 20 to drop to its pendulous position irrespective of the point of its release so that it may turn either clockwise or counterclockwise to arrive at its final rest position in a vertical direction with the projection 22 lowermost. The fitting between the opening 33 of the spring and the post 15, as well as the fitting between the later and the trapezoidally-shaped opening 26 in the dialing arm may be made with substantial clearance, so that critical manufacturing tolerances need not be observed. The same is true of the sleeve 24 surrounding the projection 23, since it makes little difference how loosely the sleeve is rotatable on the projection 23. The non-critical dimensioning of the parts to obtain an operative assembly results in substantial economies in the cost of production thereof.

The operation of the assembly is readily apparent from the drawing. The depression of the pin 22 by the sleeve handle 24 at the predetermined opening O brings the parts into the position shown in dotted lines. Thereupon rotary manipulation of the handle 24 in a clockwise direction until the pin 22 strikes the stop S effects the desired dialing operation. The subsequent release of sleeve 24 permits the pin 22 to be withdrawn from the opening by the action of the spring 30 so that the dial is free to return to its original position by the spring incorporated in the dialing mechanism. Thereafter the arm 20 may be rotated to select another opening while the projection 22 is in raised position, to repeat the same operation. The rotary and rocking movements of the arm 20 relative to the center post 15 are executed easily by virtue of the adequate clearances afforded by the trapezoidally-shaped opening 26 surrounding the post 15 and the convexly shaped bottom and top edges of the opening 26 which cooperate with the base and top of the post. Finally, a release of the arm 20 permits it to drop to its vertically pendulous position.

In view of the fact that the diameter of the projection 22 is comparatively small relative to the size of the openings O, the indicia in the respective openings may be viewed easily as an incident to the insertion of the projection 22 in the desired opening.

A second embodiment of the invention is shown in the detailed view of Fig. 5. In this view, the dialing arm 40 is provided with a trapezoidally-shaped opening 46 with the top thereof longer than its base. Its mounting on the post 15 with the interposition of the ring 31 of spring 30 is the same as that in connection with the form shown in Figs. 2 and 3. The trapezoidal opening 46 permits the necessary rocking and pivotal movements of dialing arm 40 to take place.

The attachment lends itself to mass production by molding from suitable plastics, the colors of which may be varied to match telephone instruments of corresponding or contrasting colors. The plastic shell may be formed of transparent resinous material, for example, styrene resins, in order to accommodate an advertising disc of paper, cloth, metal, plastic or any other desired material between the cap 12 and the top surface of the shell 10 so that the same may be visible through the latter. This disc may bear the name and telephone number of any telephone advertiser so that this information is available at all times to the user of the telephone. In view of the low cost of the attachments produced in accordance with the present invention, the same could be distributed by advertisers at no cost to the telephone owner in order to gain the advantages of advertising a particular service or product.

In addition to the advertising media which may be incorporated on an advertising disc disposed on the underface of the plastic shell, a recess may be provided on the top face of the shell 10 for the accommodation of a suitable record bearer carrying the telephone number of the instrument to which it is applied. Alternatively a small rectangle on the top face of the shell 10 could be ground to a frosted finish for ready inscription of the telephone number thereon.

While we have described our invention as embodied in a specific form and as operating in a specific manner for purposes of illustration, it should be understood that we do not limit our invention thereto, since various modifications will suggest themselves to those skilled in the art without departing from the spirit of our invention, the scope of which is set forth in the annexed claims.

We claim:

1. In an attachment for an automatic telephone transmitter having a rotatable dial with a central cap and circumferentially arranged openings therearound, comprising a plastic shell frictionally engaging said cap, a post extending from the top of the center of said shell, a unitary arm having a trapezoidally-shaped opening in one end thereof embracing said post whereby said arm is rockably as well as pivotally mounted thereon, a unitary downward projection on the opposite end of said arm adapted selectively to extend into one of said openings below the plane of said dial, and a spring mounted on the underside of said arm and extending to said post for normally maintaining said projection above the level of the plane of said dial.

2. In an attachment for an automatic telephone transmitter having a rotatable dial with a central cap and circumferentially arranged openings therearound, comprising a plastic shell frictionally engaging said cap, a cylindrical boss extending from the top of the center of said shell, a unitary arm having a trapezoidally-shaped opening in one end thereof and embracing said boss whereby said arm is rockably as well as pivotally mounted thereon, a unitary downward projection on the opposite end of said arm adapted selectively to extend into one of said openings below the plane of said dial, and a sheet metal spring mounted on the under-side of said arm and extending to said boss for normally maintaining said projection above the level of the plane of said dial, and in position to permit it, when free, to rotate into a vertical pendulous position.

3. A device as set forth in claim 2 wherein said last-mentioned spring is of a leaf type having a circular end fitting over said boss below said arm and its free end resiliently pressing upwardly against said arm for normally maintaining said projection above the level of the plane of said dial.

4. A device as set forth in claim 3 wherein the cylindrical boss is provided with a lateral offset at the upper end thereof for retaining the apertured end of the arm therebelow, and the top and bottom edges of said arm on the opposite sides of the trapezoidal-shaped opening are formed convexly to assist the rocking movement of said arm above the circular end of said spring.

5. A device as set forth in claim 2 wherein a lateral abutment is formed on said lateral projection above the lower end of said projection, which abutment is adapted to strike against the upper surface of the rotatable dial and thereby to limit the downward rocking movement of said arm.

References Cited in the file of this patent

UNITED STATES PATENTS

| | | |
|---|---|---|
| 1,736,330 | Schmidt | Nov. 19, 1929 |
| 1,912,624 | Douglas | June 6, 1933 |
| 1,964,561 | Douglas | June 26, 1934 |
| 2,097,384 | Segeal | Oct. 26, 1937 |
| 2,525,909 | Joyce | Oct. 17, 1950 |

FOREIGN PATENTS

| | | |
|---|---|---|
| 416,544 | Great Britain | Sept. 17, 1934 |